US012425789B2

(12) United States Patent
Helm et al.

(10) Patent No.: US 12,425,789 B2
(45) Date of Patent: Sep. 23, 2025

(54) METHOD AND SYSTEM FOR SURROUND SOUND SETUP USING MICROPHONE AND SPEAKER LOCALIZATION

(71) Applicant: Bang & Olufsen A/S, Struer (DK)

(72) Inventors: Jonas Martin Helm, Hamburg (DE); Jakob Dyreby, Struer (DK)

(73) Assignee: Bang & Olufsen A/S, Struer (DK)

( * ) Notice: Subject to any disclaimer, the term of this patent is extended or adjusted under 35 U.S.C. 154(b) by 231 days.

(21) Appl. No.: 18/236,230

(22) Filed: Aug. 21, 2023

(65) Prior Publication Data

US 2024/0064484 A1 Feb. 22, 2024

(30) Foreign Application Priority Data

Aug. 22, 2022 (EP) .................................... 22191484

(51) Int. Cl.
*H04S 7/00* (2006.01)
*H04R 5/02* (2006.01)
*H04R 5/04* (2006.01)

(52) U.S. Cl.
CPC ............... *H04S 7/301* (2013.01); *H04R 5/02* (2013.01); *H04R 5/04* (2013.01); *H04R 2499/10* (2013.01)

(58) Field of Classification Search
CPC .. H04S 7/301; H04R 5/02; H04R 5/04; H04R 2499/10
See application file for complete search history.

(56) References Cited

U.S. PATENT DOCUMENTS

2007/0133813 A1 6/2007 Morishima
2012/0288124 A1 11/2012 Fejzo et al.
2013/0156198 A1 6/2013 Kim et al.
2014/0119561 A1 5/2014 Banks et al.
2015/0016642 A1 1/2015 Walsh et al.
2018/0091898 A1 3/2018 Yoon et al.
2022/0095052 A1 * 3/2022 Nielsen .................. H04R 1/406

FOREIGN PATENT DOCUMENTS

CN 110677771 A 1/2020
EP 3416410 A1 12/2018
WO WO-2018/064410 A1 4/2018

* cited by examiner

*Primary Examiner* — Andrew Sniezek
(74) *Attorney, Agent, or Firm* — Harness, Dickey & Pierce, P.L.C.; Anthony G. Fussner

(57) ABSTRACT

The present disclosure relates to a method and system for calibrating a loudspeaker system in an environment (1). The loudspeaker system comprises an audio device (10) with a first and second loudspeaker arranged with a predetermined horizontal separation. The method comprises the steps of emitting (S2*a*, S2*b*) a first and second calibration audio signal from the first and second loudspeaker (11) of the audio device (10), wherein the second calibration audio signal is distinguishable from the first calibration audio signal. The method further comprises receiving (S3*a*, S3*b*), with a first external microphone (20) the first and second calibration audio signal, determining (S4) the position of the first external microphone (20) relative to the audio device (10) and calibrating (S8) the loudspeaker system based on the determined position of the first external microphone (20).

19 Claims, 8 Drawing Sheets

METHOD AND SYSTEM FOR SURROUND SOUND SETUP USING MICROPHONE AND SPEAKER LOCALIZATION

CROSS REFERENCE TO RELATED APPLICATION

This application claims priority to and the benefit of European Patent Application No. 22191484.9 filed Aug. 22, 2022, which is incorporated herein by reference in its entirety.

TECHNICAL FIELD OF THE INVENTION

The present disclosure relates to a method and system for calibrating a loudspeaker system comprising a plurality of loudspeakers, and particularly calibrating a loudspeaker system involving an audio device comprising at least a fixed loudspeaker pair.

BACKGROUND OF THE INVENTION

For audio systems such as surround sound systems or 3D audio systems a high number of loudspeakers are placed around an intended listening position in a predetermined manner to generate a sound field which enhances immersion, e.g., by providing spatial effects, at the listening position. For instance, in a conventional 5.1 surround sound system one loudspeaker is placed in the center position, straight in front of the listening position, a left and right loudspeaker is placed at the front left and front right positions of the listening position (e.g., at ±30° from the center loudspeaker), and a rear left and rear right loudspeaker is placed behind the listening position (e.g., at ±110° from the center loudspeaker). A Low-Frequency Effect (LFE) loudspeaker (e.g., subwoofer) may also be placed somewhere in the environment, however as the lower frequencies are less directive compared to higher frequencies reproduced by the other loudspeakers the placement of the LFE loudspeaker is usually less constrained.

In practice, placing the loudspeakers of a surround system at the exactly prescribed positions and with equal distances to the listening position is often difficult or impossible due to e.g., the layout and furnishing of the venue in which the surround system is to be installed. To this end, a calibration of the audio system is usually performed after installation of the loudspeakers wherein non-idealities such as loudspeaker placement errors, individual loudspeaker gains or audio signal delays are considered and compensated for by tuning the audio processing of the audio signals provided to each loudspeaker. For instance, a loudspeaker placed closer to the listening position may be assigned a larger audio signal reproduction delay and a lower audio signal gain compared to a loudspeaker positioned further away from the listening position, so as to balance the two speakers and compensate for the higher acoustic attenuation and longer travel time experienced by audio waves traveling to the listening position from the more distant loudspeaker.

The calibration of the loudspeakers of the audio system can however become cumbersome and time consuming. Even for a trained calibration expert it could take 20 minutes or more to calibrate a conventional 5.1 or 7.1 surround setup while the calibration requires even more time for surround setups with even more speakers, such as 5.1.4 setups, 7.1.4 setups or 10.2 setups. Accordingly, calibrating audio system is a cumbersome task, even for calibration experts, meaning that many regular users of surround sound audio systems do not bother performing a calibration and keep using their audio system with sub-optimal settings.

To this end, different solutions have been proposed to make the audio system calibration automatic, which is much more time efficient and convenient compared to manual calibration. Examples of such solutions include those described in US2015/0016642 A1, US2014/0119561 A1, US2013/0156198 A1, US2012/0288124 A1, EP 3 416 410 A1, WO2018/064410 A1, and CN110677771 A. For example, in US2015/0016642 A1 a solution is presented wherein a microphone array on a soundbar is used to record an utterance made by the user sitting at the listening position. By analyzing the recorded utterance of the microphone array the listening position relative to the soundbar can be determined. Furthermore, in US2014/0119561 A1 a wireless input/output device is placed at the listening position and each of a plurality of individual wireless loudspeaker is used to play a test tone which is recorded by the input/output device. By analyzing the recording of the test tone obtained by the wireless input/output device the wireless loudspeakers can be configured. Additionally, by providing each wireless loudspeaker with an individual input/output device, the location of each wireless loudspeaker can be accurately determined.

A drawback with these solutions is that to determine the position of each loudspeaker sophisticated and costly array microphones must be used or individual microphones and two-way communication capabilities must be present in each loudspeaker, which is not the case for most loudspeakers. Additionally, in most solutions the user must interact with the audio system during calibration, e.g., by making an utterance in one or more positions or provide feedback regarding the performance of the audio system to help the calibration process converge, which is inconvenient and prone to human error.

SUMMARY OF THE INVENTION

In view of the above it is evident that there is a need for a method and system for calibrating loudspeaker systems which is simple to use, cost effective and accurate while also not burdening the user by requiring that the user is involved in the calibration process. It is the purpose of the present invention to provide such a method and system for performing loudspeaker system calibration and according to a first aspect of the invention there is provided a method for calibrating a loudspeaker system in an environment, wherein the first external microphone is arranged on a microphone stand configured to position the first external microphone at a predetermined listening position height relative to a ground plane of the environment. The loudspeaker system comprises an audio device with a first and second loudspeaker, the first and second loudspeaker arranged with a predetermined horizontal separation. The method comprises the steps of a) emitting a first calibration audio signal from the first loudspeaker of the audio device,
b) emitting a second calibration audio signal from the second loudspeaker of the audio device, wherein the second calibration audio signal is distinguishable from the first calibration audio signal,
c) receiving, with a first external microphone placed at a listening position in the environment, the first and second calibration audio signal,
d) determining, based on the received first and second calibration audio signal, the position of the first external microphone relative to the audio device, wherein determining the position comprises determining at least one of an azimuth angle, θ, of the first external microphone relative to the audio device and a radial distance, $d_{center}$, between the first external microphone and the audio device, and determining, based on the received first and second calibration audio signal and the predetermined listening position height associated with the microphone stand an elevation angle, φ of the first external microphone relative to the audio device. The method further comprises:

e) calibrating the loudspeaker system based on the determined position of the first external microphone.

It is understood that the first and second loudspeaker are fixed at respective positions in the audio device such that the first and second loudspeakers are separated with a known horizontal separation distance. Each loudspeaker comprises at least one loudspeaker element/loudspeaker transducer meaning that each loudspeaker may comprise one or two or more loudspeaker elements/transducers (e.g., one for each of low-, mid-, and high-range frequencies). In some implementations, the audio device is a soundbar which extends in a horizontal direction with the first and second loudspeaker arranged symmetrically in the soundbar, in a same horizontal plane. The soundbar may be configured to be installed below or above a television.

With the calibration audio signals being distinguishable it is meant that the first and second calibration audio signal are distinguishable in at least one of time and frequency. For example, the calibration audio signals could be emitted sequentially with one calibration audio signal being emitted before the other (thereby making the signals distinguishable in time) or the calibration audio signal could comprise at least partially non-overlapping frequency content thereby making at least a portion of one calibration audio signal distinguishable from the other.

With receiving it is meant that the first external microphone detects the audio which is emitted from the first and second loudspeaker. Receiving may alternatively be referred to as recording, although it is understood that the received audio of a microphone is not necessarily recorded onto a storage media. Also, the first external microphone could be any type of microphone. Preferably, the first external microphone is a simple microphone with a single microphone element (as opposed to complicated microphone arrays comprising multiple microphone elements) and with omnidirectional directivity. With the present method it is not necessary that the first external microphone is capable of detecting the direction of incidence of the audio it receives.

With calibrating the loudspeaker system it is meant that any form of calibration using the position of the audio device relative to an intended listening position is performed. In some implementation, calibration of the loudspeaker system comprises adjusting at least one of a gain, equalization, delay or loudspeaker role of a loudspeaker in the loudspeaker system. The loudspeakers in the loudspeaker system which are calibrated comprises at least one of: the first and second loudspeakers of the audio device, at least one external loudspeaker and at least one additional loudspeaker of the audio device. For instance, while the first and second loudspeaker of the audio device are used to determine the position of the first external microphone (and may also be used to present audio content) the audio device may comprise one or more additional loudspeakers (e.g., sidewards- or upwards-firing loudspeakers).

The invention is at least partially based on the understanding that with an audio device comprising a fixed first and second loudspeaker the position of a first external microphone positioned in front of the audio device can be determined accurately in at least one dimension. With the position of the first external microphone determined it is possible to calibrate the loudspeakers of the audio device (and/or calibrate any external loudspeakers) to enhance the performance of the loudspeaker system and make the dynamics of the loudspeaker system well suited to the acoustic environment and the listening position. The method is completely automatic and does not require any user intervention which means that the calibration can be performed rapidly, in a convenient manner.

According to the first aspect of the invention, the position of the first external microphone indicates an azimuth angle of the first external microphone relative to the audio device and/or a radial distance of the first external microphone relative to the audio device. That is, the position of the first external microphone may be determined accurately in at least one or at least two dimensions.

According to the first aspect of the invention, the method further comprises obtaining a predetermined listening position height relative to a ground plane of the environment and determining, based on the listening position height, the position of the first external microphone relative to the audio device. Wherein the position of the first external microphone comprises an elevation angle of the first external microphone relative to the audio device.

It has been realized that the listening position height relative to a ground plane of the environment as well as the installation height of the audio device relative to the ground plane of the environment is approximately the same from one user setup of a loudspeaker system to another. Accordingly, with a predetermined listening position height the elevation angle of the listening position relative to the audio device could be determined.

In some implementations, determining the position of the first external microphone relative to the audio device comprises determining a time of arrival of the received first and second calibration audio signal and determining the position of the first external microphone based on the time of arrival of the received first and second calibration audio signals and the speed of sound.

Optionally, the method further comprises obtaining a delay metric of the first and second loudspeaker respectively, the delay metric indicating a duration between a first point in time, when the first or second calibration audio signal is provided to the first or second loudspeaker, and a second point in time, when the first or second calibration audio signal is reproduced by the first or second loudspeaker. Wherein determining the position of the first external microphone is further based on the delay metric of the first and second loudspeaker.

By analyzing the time of arrival of the calibration audio signals the position of the first external microphone can be determined. For example, by using the Time Difference Of Arrival (TDOA) of the calibration audio signals and the speed of sound the azimuth angle of the first external microphone can be determined. As a further example, the absolute Time Of Arrival (TOA) of the calibration audio signals and the speed of sound could be used to determine the distance between the audio device and the first external microphone. However, the inventors have also realized that the TOA and TDOA depends in part on the acoustic travelling time of audio from the audio device to the first external microphone and in part on one or more internal processing delays of the audio device. The TOA or TDOA as measured with the first external microphone must be adjusted with these one or more internal processing delays to get an accurate measure of the acoustic travelling time. The delay metric indicates these one or more internal processing delays and may be known (e.g., from manufacturer specifications of the audio device).

However, in some implementations the audio device comprises a first and second internal microphone, at known respective distances to the first and second loudspeaker, wherein the delay metric of each loudspeaker is measured by emitting a sound from the first and second loudspeaker and receiving the sound with the first and second internal microphone of the audio device. As the physical separation between each internal microphone and loudspeaker is known, the delay metric can be extracted by comparing the measured delay with the expected acoustic delay associated with the known physical separation.

In some implementations, the loudspeaker system further comprises at least one external loudspeaker being separate from the audio device and the audio device further comprises a first and second microphone arranged at predetermined positions on the audio device and the method further comprises the steps of:

f) emitting a test audio signal from the at least one external loudspeaker,
g) receiving the test audio signal with the first external microphone,
h) receiving the test audio signal with the first and second internal microphone, and
i) determining the position of the at least one external loudspeaker based on the position of the first external microphone and the received test signal of the first external microphone and the first and second internal microphone. Wherein calibrating the loudspeaker system is further based on the determined position of the at least one external loudspeaker.

It is understood that steps g) and h) involving receiving the test audio signal with the first external microphone and the internal microphones may occur simultaneously, or at least these steps are partially overlapping in time. There will however be a slight difference in time (e.g., in the order of milliseconds) when the test audio signal first reaches each microphone due to the difference in acoustic travel distance. However, for any test audio signal having a duration exceeding this Time Difference Of Arrival steps g) and h) will occur at least partially overlapping in time.

That is, using the position of the first external microphone the position of at least one external loudspeaker may be determined wherein the loudspeaker system is calibrated based on the position of the external loudspeaker in addition to the position of the first external microphone relative to the audio device.

In some implementations the method further comprises obtaining a loudspeaker property of the at least one external loudspeaker and wherein determining the position of the at least one external loudspeaker is further based on the loudspeaker property of the at least one external loudspeaker.

With a loudspeaker property it is meant at least one of a type of loudspeaker, a loudspeaker model, a loudspeaker mounting height and a loudspeaker internal processing delay. The loudspeaker property may be specified by the user (e.g., entering the loudspeaker information in his/her user device and sending the information to a central control unit) or the loudspeaker property may be stored in each loudspeaker and communicated to the central control unit. With the loudspeaker property the position of the external loudspeakers may be determined with enhanced accuracy.

In some implementations, the method further comprises providing a second external microphone or a third internal microphone in the environment and receiving the test audio signal of the at least one external loudspeaker with the second external microphone or third internal microphone. Wherein determining the position of the at least one external loudspeaker is further based on the received test audio signal of the second external microphone or third internal microphone and the position of the second external microphone or third internal microphone relative to the audio device.

With a second external microphone, the position of the external loudspeakers can be determined with enhanced accuracy without the need for emitting the calibration audio signals and test audio signals a second time.

In some implementations, the method further comprises repeating steps a) to d), f) and g) from the above after the first external microphone has been moved to a new position, the new position being different from the listening position. Wherein determining the position of the at least one external loudspeaker is further based on the position of the first external microphone at the new position and the received test signal of the first external microphone at the new position.

Thus, by moving the first external microphone and emitting the calibration audio signals and the test audio signals again the position of the external loudspeakers may be determined more accurately, without the need for a second external microphone. Accordingly, the enhanced accuracy may be achieved by utilizing at least one of: a loudspeaker property, a first external microphone moved to a new position, or a second external microphone.

In some implementations the audio device comprises a sidewards-firing loudspeaker and/or an upwards-firing loudspeaker and the audio device comprises at least two loudspeakers configured to establish two acoustic channels forming a binaural/transaural acoustic channel pair impinging a predetermined spatial region for loudspeaker virtualization. The method further comprises determining if the position of the first external microphone is within the predetermined spatial region. If the position is within the predetermined spatial region, the calibration comprises disabling the at least one of a sidewards-firing loudspeaker and an upwards-firing loudspeaker. On the other hand, if the position is outside the predetermined spatial region, the calibration comprises disabling the loudspeaker virtualization.

Accordingly, calibrating the loudspeaker system may entail selecting whether loudspeaker virtualization (i.e. establishing two acoustic channels forming a binaural acoustic channel pair) should be used to achieve a surround sound effect or if the sidewards- and/or upwards-firing loudspeaker(s) should be used based on the first external microphone's position relative to a preferred listening spatial region within which loudspeaker virtualization is known to work well. After the selection has been performed, the calibration may continue with determining loudspeaker delays, loudspeaker gains and/or loudspeaker roles with only one of loudspeaker virtualization and sidewards- and/or upwards-firing loudspeaker(s) enabled. Optionally, if no selection of loudspeaker virtualization and sidewards- and/or upwards-firing loudspeaker(s) has been made the audio device may utilize both loudspeaker virtualization and sidewards- and/or upwards-firing loudspeaker(s) simultaneously, which is suitable in some circumstances. In some implementations, the audio device comprises a crosstalk canceller which processes the audio signals provided to the loudspeakers used for loudspeaker virtualization so as to remove any crosstalk between the acoustic channels.

The at least two loudspeakers may be the same loudspeakers as the first and second loudspeaker or different loudspeakers of the audio device. If loudspeaker virtualization is disabled, the at least two loudspeakers may be used to output audio without loudspeaker virtualization. Also, it is envisaged that even if loudspeaker virtualization is enabled the first and second loudspeaker may also emit additional audio content (e.g., different audio channels of a surround format) besides the loudspeaker virtualization content.

According to a second aspect of the invention there is provided a computer program product comprising instructions which, when the program is executed by a central control unit of the audio device, causes the central control unit to carry out the method according to the first aspect.

According to a third aspect of the invention there is provided a system for calibrating a loudspeaker system in an environment. The system comprises an audio device, comprising a first loudspeaker and a second loudspeaker arranged with a predetermined horizontal separation, and a first external microphone, configured to be placed at a listening position in the environment, wherein the first external microphone is arranged on a microphone stand configured to position the first external microphone at a predetermined listening position height relative to a ground plane of the environment. The system further comprises a central control unit. The central control unit configured to cause a first calibration audio signal to be emitted from the first loudspeaker, cause a second calibration audio signal to be emitted from the second loudspeaker, cause the first external microphone to receive the first and second calibration audio signal, determine, based on the received first and second calibration audio signal, the position of the first external microphone relative to the audio device by determining at least one of an azimuth angle, θ, of the first external microphone relative to the audio device and a radial distance, $d_{center}$, between the first external microphone and the audio device, and determining, based on the received first and second calibration audio signal and the predetermined listening position height associated with the microphone stand an elevation angle, φ, of the first external microphone relative to the audio device. The central control unit is further configured to calibrate the loudspeaker system based on the determined position of the first external microphone.

According to the third aspect of the invention, the first external microphone comprises a microphone stand configured to position the microphone at a predetermined listening position height relative to a ground plane of the environment. With a stand it is ensured that the first external microphone is placed at the predetermined listening position height in all setups.

The invention according to the second and third aspect features the same or equivalent benefits as the invention according to the first aspect. Any functions described in relation to the method, may have corresponding features in a system or a computer program product.

According to a fourth aspect of the invention there is provided a kit comprising an audio device with two loudspeakers and an external microphone provided on a stand, wherein the audio device comprises a controller configured to perform the method according to the first aspect.

The audio device may be a soundbar configured to be mounted above or below a television.

With a kit according to the fourth aspect of the invention it will be more likely that a user who obtains the kit performs a more accurate calibration of loudspeakers. As the predetermined listening position height, associated with the height of the external calibration microphone stand, may be known beforehand by the central control unit the calibration can be made much more accurate.

For example, in comparison to an envisaged small calibration microphone without a stand it is not possible to distinguish if the microphone is placed on the floor, on the seat of a couch or on the top of the backrest of the couch without additional calibration signals and/or more complicated calibration signal processing. With the external microphone provided on a stand with a predetermined height, and provided as a kit together with the audio device, the user must use the stand to calibrate the loudspeakers. By doing so, the external microphone will be arranged closer to the actual listening position, i.e. the position of the user's ears when he/she is listening to audio content. Accordingly, the user's influence over placement of the external microphone is reduced, at least on the height direction, so as to provide enhanced calibration accuracy.

BRIEF DESCRIPTION OF THE DRAWINGS

These and other aspects of the invention will now be described in more detail, with reference to the appended drawings showing exemplary embodiments of the present invention, wherein.

FIG. **3*a*** illustrates an audio device with sidewards- and upwards-firing loudspeakers according to some implementations.

FIG. **3*b*** illustrates the audio device with sidewards- and upwards-firing loudspeakers placed in an acoustic environment according to some implementations.

Figure 4:
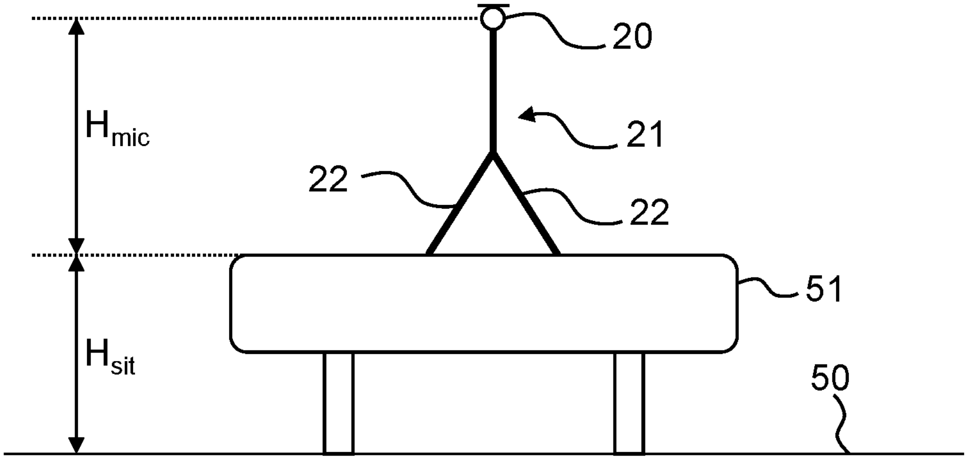

FIG. 4 illustrates a first external microphone according to some implementations.

FIG. **5*a*** depicts schematically how the position of a first external microphone relative to the audio device is determined in a two-dimensional plane according to some implementations.

FIG. **5*b*** depicts schematically how the inclination of the two-dimensional plane, in which the first external microphone is positioned, is determined, according to some implementations.

FIG. **6*a*** is a flowchart describing a method for calibrating a loudspeaker system according to some implementations.

FIG. **6*b*** is a flowchart describing in detail how the position of one or more external loudspeakers may be determined by moving the first external microphone according to some implementation.

FIG. **6*c*** is a flowchart describing in detail how the position of an external loudspeaker(s) may be determined with a second external microphone according to some implementation.

FIG. **7*a*** depicts schematically how the position of an external loudspeaker(s) is determined according to some implementations.

FIG. **7*b*** depicts schematically how the position of an external loudspeaker is determined by moving the first external microphone, according to some implementations.

FIG. **7*c*** depicts schematically how the position of an external loudspeaker is determined by using a second external microphone, according to some implementations.

Figure 8:
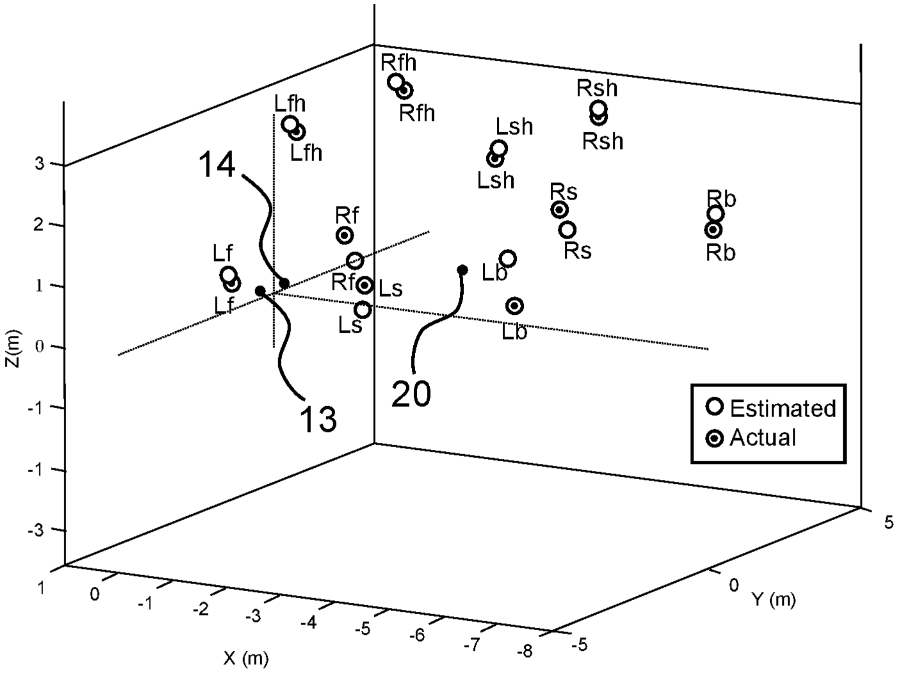

FIG. 8 is a graph illustrating an example of external loudspeaker positions as determined with a method of the present disclosure.

DETAILED DESCRIPTION OF CURRENTLY PREFERRED EMBODIMENTS

Figure 1:
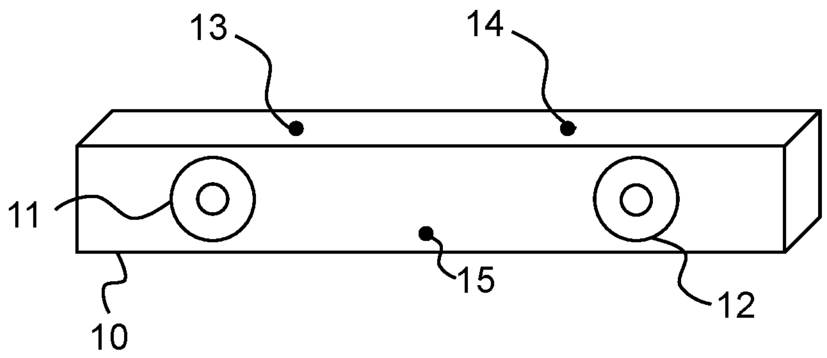
FIG. 1 illustrates an audio device according to some implementations.

FIG. 1 depicts a loudspeaker system comprising an audio device 10, the audio device 10 comprising a first loudspeaker 11 and a second loudspeaker 12. The first and second loudspeakers 11, 12 are arranged at a predetermined horizontal separation. Preferably, but not necessarily, the first and second loudspeakers 11, 12 are arranged in a same, substantially horizontal, plane. Also, the first and second loudspeakers 11, 12 may be directed substantially towards a same direction.

The audio device 10 comprises a rigid body which mechanically links the first and second loudspeaker 11, 12 to ensure that the first and second loudspeaker 11, 12 are arranged with the predetermined horizontal separation distance at all times. In some implementations, the audio device 10 is a soundbar comprising an elongated body configured to be arranged substantially horizontally, e.g., above or below a television. The audio device 10 thereby comprises a forward facing side, arranged to face an acoustic environment (e.g., a living room), and a rearward facing side opposite the forward facing side. The first and second loudspeakers 11, 12 of the audio device 10 in FIG. 1 are arranged symmetrically on the audio device 10 and in the forward facing side so as to be directed towards the acoustic environment. However, this placement of the loudspeakers 11, 12 is merely exemplary and it is envisaged that the loudspeakers 11, 12 may be arranged and/or directed differently relative to the audio device 10. For instance, the loudspeakers 11, 12 may be placed symmetrically or non-symmetrically on either side of a plane of symmetry of the audio device 10. It is envisaged that the loudspeakers 11, 12 may have a wide directivity or directed in parallel, diverging or converging directions. Regardless of where the loudspeakers 11, 12 are arranged, or how they are directed, it is appreciated that their placement relative to each other (e.g., their separation in the horizontal and optionally vertical direction) is fixed by the construction of the audio device 10, wherein the audio device 10 has a preferred installation orientation. The audio device 10 may further comprise a first internal microphone 13 and a second internal microphone 14 configured to receive audio signals. The internal microphones 13, 14 of the audio device 10 depicted in FIG. 1 are arranged on the top side of the audio device 10 and arranged symmetrically around a plane of symmetry of the audio device 10. However, this particular arrangement of the internal microphones 13, 14 is merely exemplary, and the internal microphones 13, 14 may be arranged arbitrarily on the audio device 10 in a symmetrical or non-symmetrical fashion. Preferably, the internal microphones 13, 14 are arranged at some separation from each other. Regardless of where on the audio device 10 the internal microphones 13, 14 are arranged it is noted that the positions of the internal microphones 13, 14 are fixed relative to the first and second loudspeaker 11, 12.

In some implementations, the audio device comprises only two internal microphones 13, 14, alternatively, the audio device 10 further comprises a third internal microphone 15 which could be used to resolve an external loudspeaker ambiguity as will be described in more detail in the below.

Figure 2:
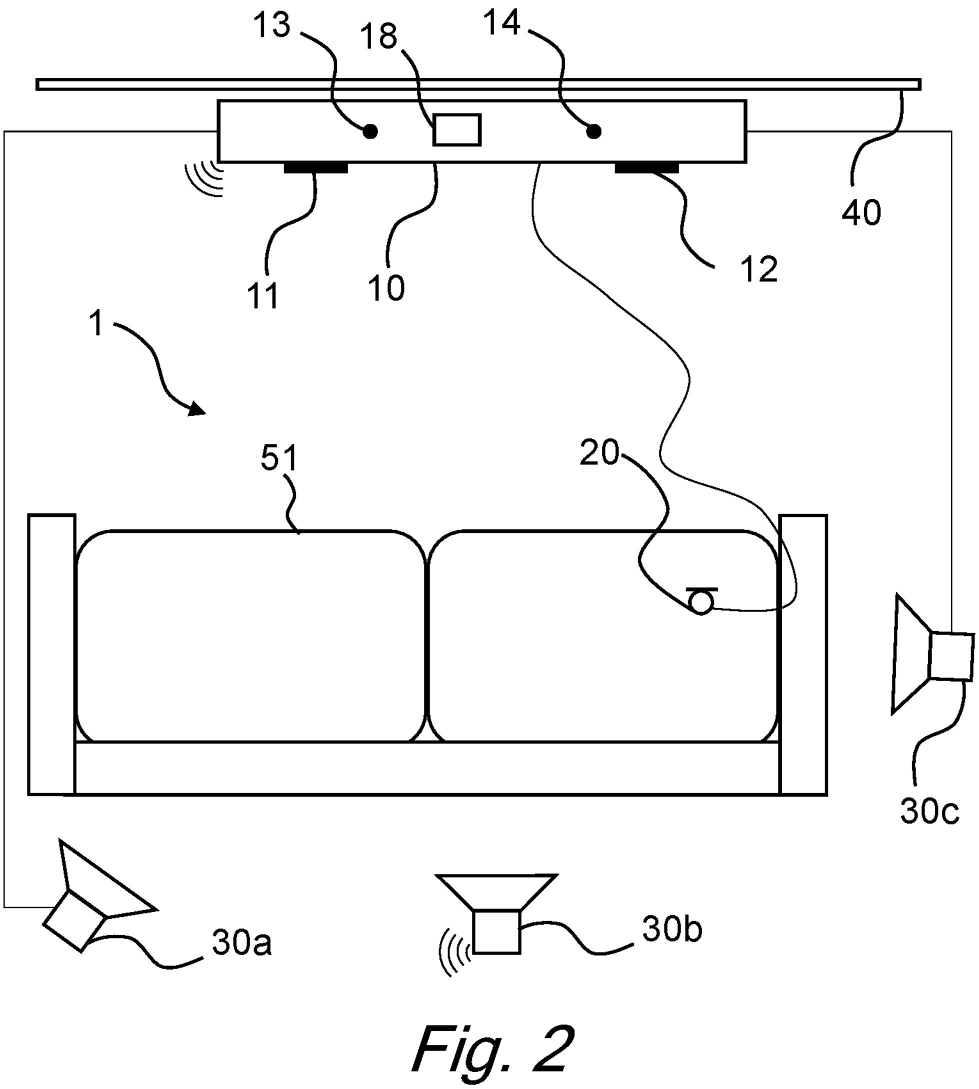
FIG. 2 illustrates an acoustic environment according to some implementations.

With further reference to FIG. 2, a loudspeaker system is illustrated comprising an audio device 10 and a plurality of external loudspeakers 30*a*, 30*b*, 30*c*. The depicted loudspeaker system is placed in a living room, which is one example of an acoustic environment 1. The exemplary acoustic environment 1 of FIG. 2 comprises a television 40 (e.g., mounted onto a wall) and a couch 51 positioned so as to allow a user to sit in the couch 51 and watch the television 40. In the depicted example, the audio device 10 is arranged just below the television 40 with the first and second loudspeakers 11, 12 facing the couch 51. In some implementations, the audio device 10 is configured to be mounted with the rearward side arranged against a wall or placed on a piece of furniture with the rearward side facing a wall and the forward facing side facing the acoustic environment 1. For example, the audio device 10 could be mounted onto the wall just below or above the television 40 or placed on a piece of furniture provided above or below the television 40.

While it is envisaged that the audio device 10 could be placed anywhere, with or without a television 40, the arrangement presented in FIG. 2 is preferable as this allows the loudspeakers 11, 12 of the audio device 10 to act as front loudspeakers in a surround sound setup used for a home theater application.

In some implementations, the audio device 10 is configured to cooperate with at least one external loudspeaker 30*a*, 30*b*, 30*c* also placed in the acoustic environment 1. For example, the at least one external loudspeaker 30*a*, 30*b*, 30*c* may be a satellite loudspeaker arranged to emit sounds which a user, sitting on the couch 51 and facing the television 40, perceives as originating from behind, above, below or to the side of the user. In some implementations, the audio device 10 and the at least one external loudspeaker 30*a*, 30*b*, 30*c* forms a surround sound setup with at least two front loudspeakers (realized by the audio device 10) and at least two rear loudspeakers (realized by at least two external loudspeakers 30*a*, 30*b*, 30*c*). For example, the first and second loudspeaker 11, 12 of the audio device 10 forms the front left and front right loudspeakers of a 5.1 surround sound setup and at least two external loudspeakers 30*a*, 30*b*, 30*c* forms the rear left and rear right loudspeaker of the 5.1 surround sound setup. In a similar fashion, additional external loudspeakers 30*a*, 30*b*, 30*c* may be arranged in the acoustic environment to enable more sophisticated surround sound setups such as 5.1.2, 5.1.4, 7.1, 7.1.2, 7.1.4 or even 11.1 or 22.2.

A central control unit 18 is used to control and coordinate the operation of the loudspeakers 11, 12 of the audio device 10 and the external loudspeakers 30*a*, 30*b*, 30*c*. The central control unit 18 may be provided as a unit which is separate from the audio device 10 and the external loudspeakers 30*a*, 30*b*, 30*c* or the central control unit 18 may be integrated with at least one of the audio device 10 and the external loudspeakers 30*a*, 30*b*, 30*c*. Preferably, as shown in FIG. 2, the central control unit 18 is integrated into audio device 10 whereby each external loudspeaker 30*a*, 30*b*, 30*c* is operated by the central control unit 18 of the audio device 10.

As seen in FIG. 2, the external loudspeakers 30*a*, 30*b*, 30*c* could be wirelessly connected to the central control unit (e.g., via Bluetooth, WiSA, or Wi-Fi) or connected to the central control unit 18 by a wire.

While it is often easy for a user to install the audio device 10 at an ideal position (e.g., right below the television 40), the position at which the user will be located when e.g., watching the television 40 (with the television audio being played back by the audio device 10) is often not at the ideal position (e.g., symmetrically centered in front of the audio device 10 at a predetermined distance from the audio device 10). Additionally, if one or more external loudspeakers 30*a*, 30*b*, 30*c* are placed in the acoustic environment 1 it is often difficult for the user to arrange the one or more external loudspeakers 30*a*, 30*b*, 30*c* at the positions dictated by surround sound standards. For example, walls and furniture of the environment may not allow the user to place the external rear loudspeakers at the prescribed nominal positions for a 5.1 surround setup. Accordingly, the actual position at which the user will be located when listening to audio content, referred to as the listening position, and the placement of the audio device 10 and the external loudspeakers 30*a*, 30*b*, 30*c* relative to the listening position will vary from one setup to another. To this end, the loudspeaker system, i.e. the audio device 10 and any external loudspeakers 30*a*, 30*b*, 30*c*, must be calibrated after installation to enable the best possible performance.

This calibration is performed automatically, using the first external microphone 20 placed at the listening position, with the calibration method which is described in further detail in the below. The first external microphone 20 is placed at the intended listening position and connected to the central control unit 18. The first external microphone 20 may be connected with a wire to the central control unit 18 or it is envisaged that the first external microphone 20 connects wirelessly (not shown) to the central control unit 18.

Figure 3A:
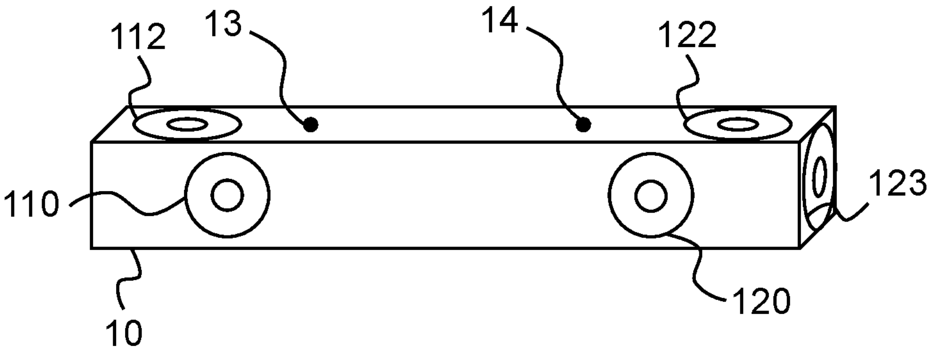
Figure 3B:
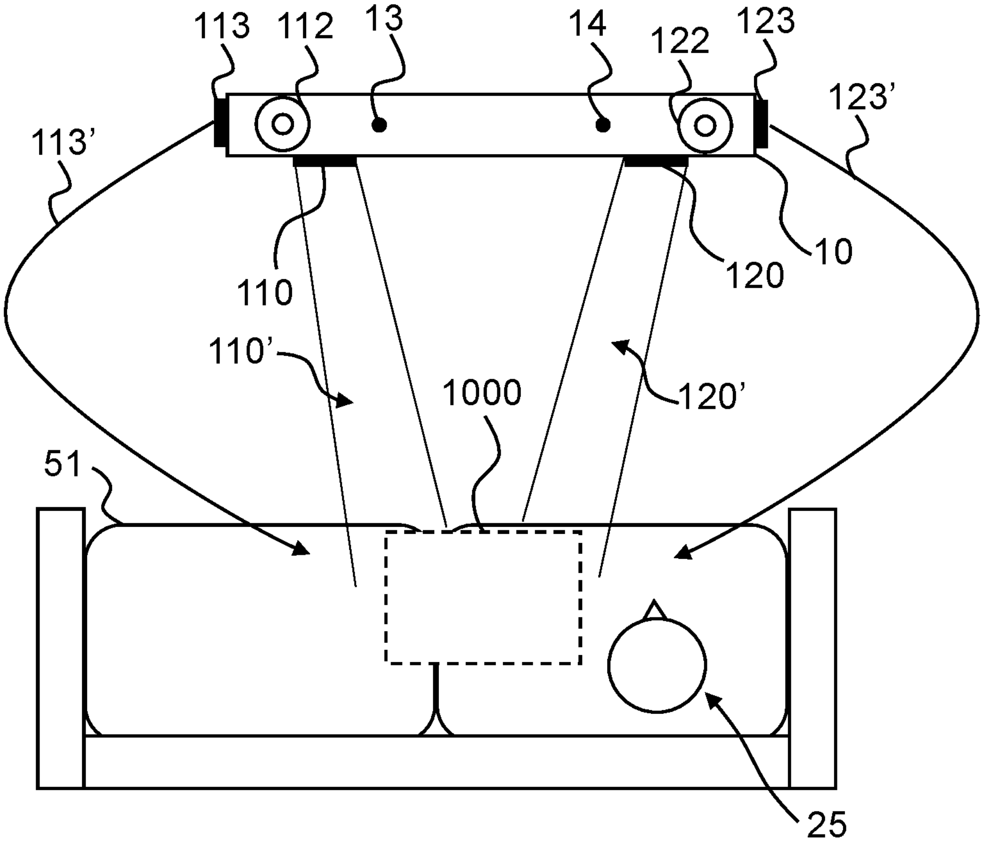

FIGS. 3*a* and 3*b* illustrate an audio device 10 which comprises at least one of: a sidewards-firing loudspeaker 113, 123 and an upwards-firing loudspeaker 112, 122 and loudspeakers 110, 120 configured to perform loudspeaker virtualization with cross-talk cancellation.

A sidewards-firing loudspeaker 113, 123 or upwards-firing loudspeaker 112, 122 is a directive loudspeaker which is arranged to emit audio signals that are reflected from the walls, ceiling and/or floor of the acoustic environment to then reach the user 25 at the listening position with a direction of incidence which is different from a direction of incidence coming from the audio device 10 straight to the user 25. In this way, the audio device 10 could enable a type of surround sound experience despite all loudspeakers being arranged essentially in front of the user 25. For example, sidewards-firing loudspeakers 113, 123 emit audio signals 113', 123' which are reflected from a right and left wall in the acoustic environment 1 and then reach the user 25 at the listening position with a respective direction of incidence similar to that of audio emitted by physical loudspeakers positioned at either side of the user 25. Accordingly, side audio channels may be enabled with sidewards-firing loudspeakers 113, 123 without the need to place physical loudspeakers at the sides of the listening position in the acoustic environment 1. Similarly, height (either above or below) and even rear audio channels may be enabled by loudspeakers firing in other directions so as to reflect the audio signals off different surfaces in the acoustic environment 1.

In some implementations, the front facing loudspeakers 110, 120 (which may be the same loudspeakers as the first and second loudspeaker 11, 12 of FIG. 1 and FIG. 2) are configured to perform loudspeaker virtualization centered on the user 25 at the listening position. In essence, loudspeaker virtualization is performed by establishing binaural acoustic channels 110', 120' between the front facing loudspeakers 110, 120 and the right and left ear of the user 25 respectively. To achieve loudspeaker virtualization crosstalk cancellation is used to mitigate crosstalk between the acoustic channels 110', 120' and, by introducing delays, gains, and filtering, to the audio signals rendered to the loudspeakers 110, 120 (e.g., based on interaural time and level differences and a head related transfer function) an effect of a virtual loudspeaker placed right next to the user 25, on the left and right side respectively, is obtainable. With loudspeaker virtualization it is possible to simulate a surround sound experience with only two loudspeakers which establish binaural acoustic channels to a respective ear of the user 25.

In some implementations, the audio device 10 comprises both loudspeakers 110, 120 configured for loudspeaker virtualization and at least one of a sidewards-firing loudspeaker 113, 123 and an upwards-firing loudspeaker 112, 122. In such implementations, the calibration of the loudspeaker system comprises determining if loudspeaker virtualization should be used or if the sidewards/upwards-firing loudspeaker(s) 113, 123, 112, 122 should be used to enable a surround experience based on the position of the user 25 (i.e. the listening position) relative to the audio device 10. While loudspeaker virtualization is preferable as it enables very convincing surround sound effects, loudspeaker virtualization often requires that the person listening to the audio content is positioned within the predetermined spatial region 1000 in front of the audio device 10 to ensure sufficient performance of the virtualization and crosstalk cancellation. On the other hand, the sidewards/upwards-firing loudspeaker(s) 113, 123, 112, 122 enable a surround sound experience which is less sensitive to where the user 25 is located, meaning that if the listening position is determined to be outside the predetermined spatial region 1000 wherein the performance of the loudspeaker virtualization performs best or in the case of multiple listeners, it may be determined that the audio device 10 should rely on the sidewards/upwards-firing loudspeaker(s) 113, 123, 112, 122 instead of loudspeaker virtualization. If this is the case, the loudspeakers 110, 120 may be disabled or used as regular loudspeakers without loudspeaker virtualization. The loudspeakers 110, 120 may be used for both virtualization and regular loudspeakers simultaneously by superposition.

FIG. 4 depicts the first external microphone 20 according to implementations. The first external microphone 20 is here a dedicated calibration microphone 20. Alternatively, in not shown embodiments it is envisaged that the first external microphone 20 is a microphone of a user device (e.g., a smartphone, laptop, tablet, smartwatch or the like). The calibration microphone 20 may e.g., be provided in a kit together with the audio device 10. The calibration microphone 20 is placed at the intended listening position in the acoustic environment 1 before the start of the calibration procedure.

Since the listening positioning is determined by the position of the user's head when the user 25 is located at the intended listening position, and since the listening position often involves the user 25 sitting in a chair or couch it may be difficult to place a microphone at the listening position and the calibration microphone 20 may then be placed at a place with a known relative displacement in at least one dimension from the listening position.

For example, the calibration microphone 20 could be placed on the sitting area of the chair or couch 51, whereby the calibration microphone 20 is displaced vertically below the intended listening position a distance $H_{mic}$ corresponding to the length of the upper body of an average human (approximately 70-80 centimeters). As a further example, the calibration microphone 20 could be placed on the backrest of the chair or couch 51 at the intended listening position whereby the calibration microphone 20 becomes displaced horizontally behind the intended listening position.

Preferably, as shown in FIG. 4, the calibration microphone 20 is arranged on a microphone stand 21 having a predetermined vertical extension of $H_{mic}$ (e.g., between 700 and 800 millimeters, such as 725 millimeters) wherein the stand 21 is configured to be placed at the intended listening position. The calibration microphone 20 may be configured to mount onto the microphone stand 21 wherein the microphone stand 21 comprises a suitable mounting portion to hold the calibration microphone 20. Alternatively, the calibration microphone 20 is integrated with the stand 21 so as to form a single unit. As the average sitting height $H_{sit}$ of couches or chairs is known, it is understood that when the calibration microphone 20 is arranged on the stand 21 and the stand 21 is arranged at the listening position, the total height $H_{mic}+H_{sit}$ of the calibration microphone 20 above the floor 50 will be known, at least approximately.

In some implementations, the stand 21 is provided with pivoting support members 22 which can be pivoted so as to fold the stand 21 into a transport position. This enables the stand 21 to take up much less space when it is not used and e.g., facilitates providing the stand 21 in a smaller package separately, or together with the audio device 10.

Figure 5A:
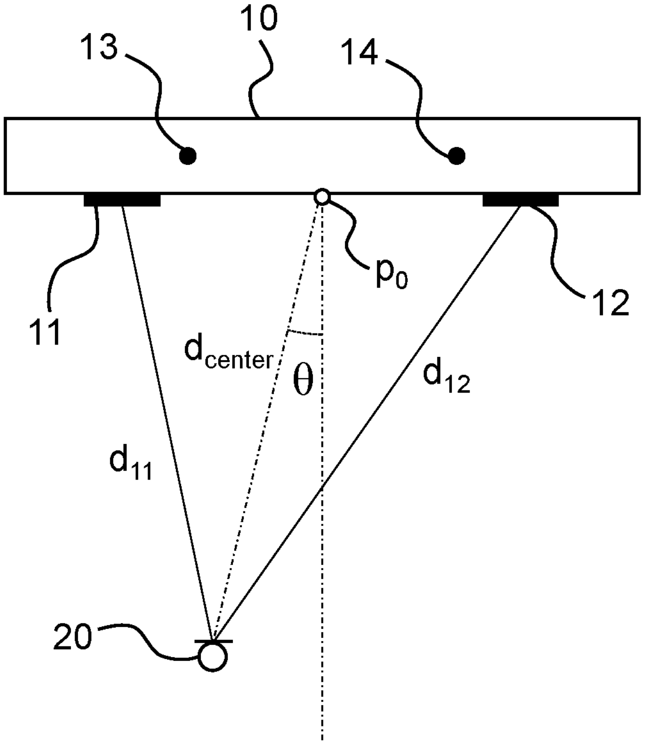
Figure 5B:
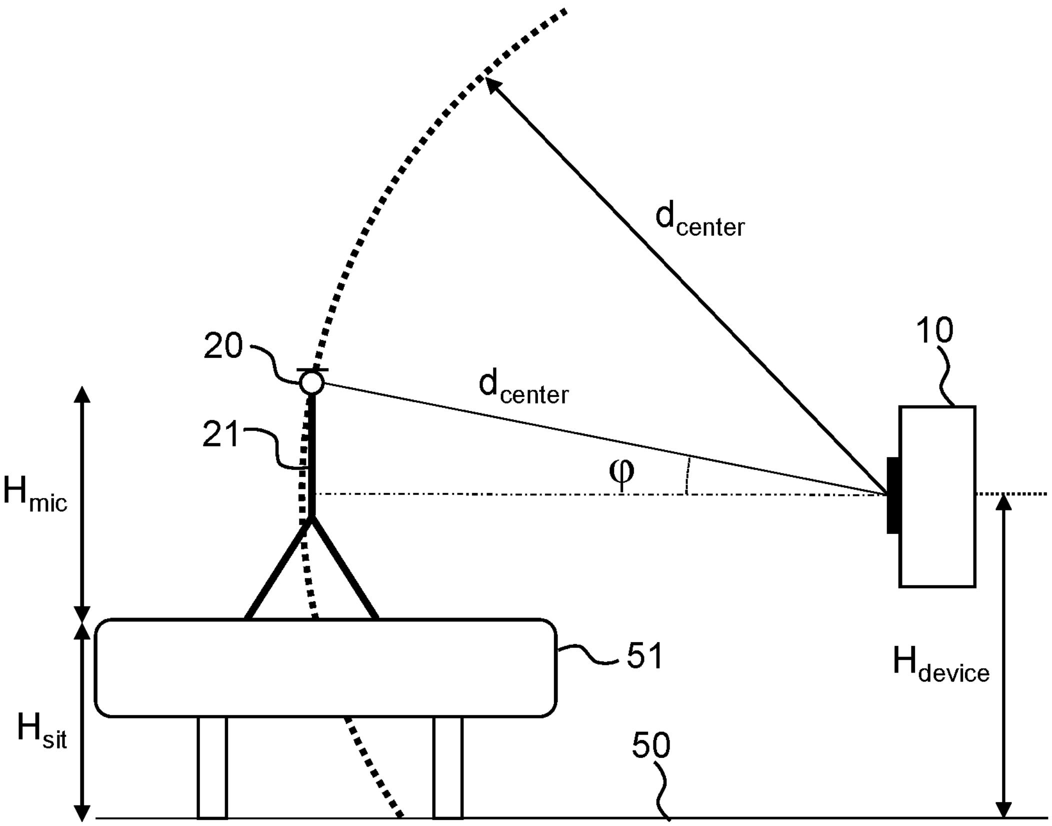
Figure 6A:
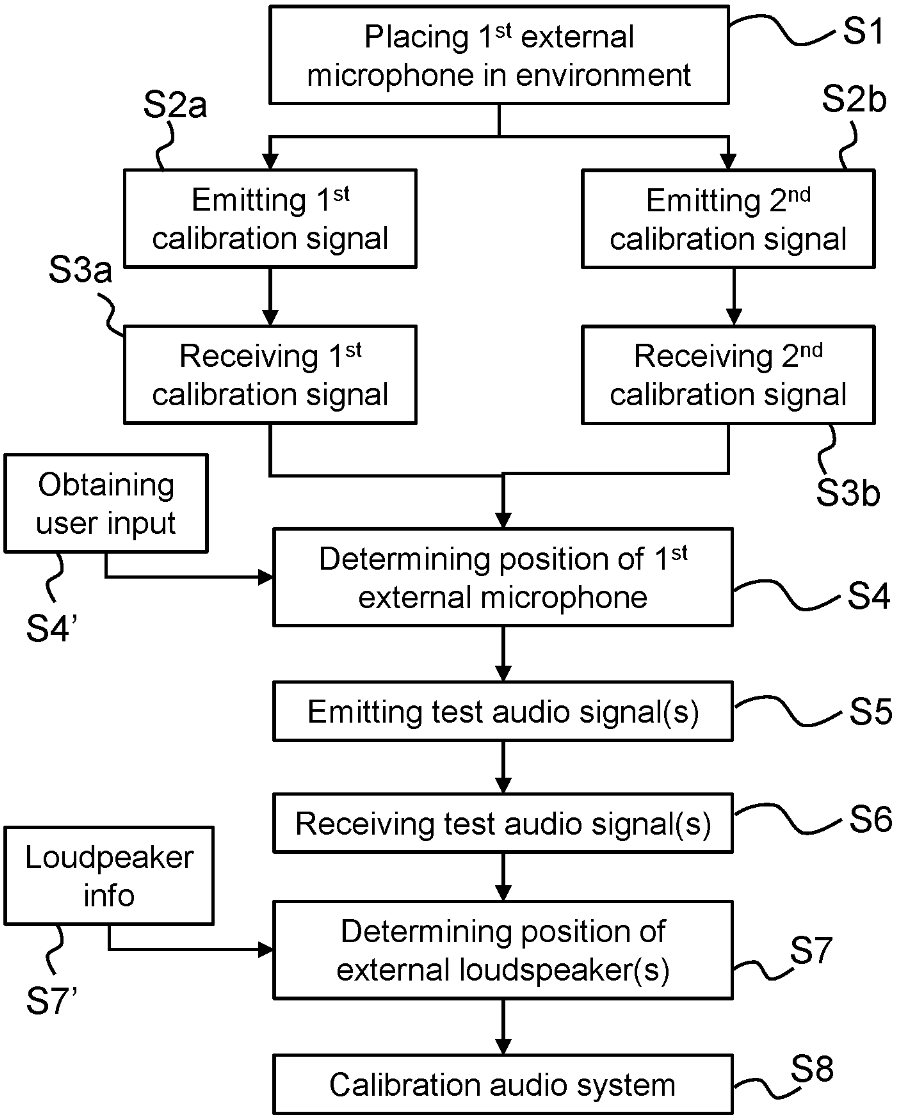
Figure 6B:
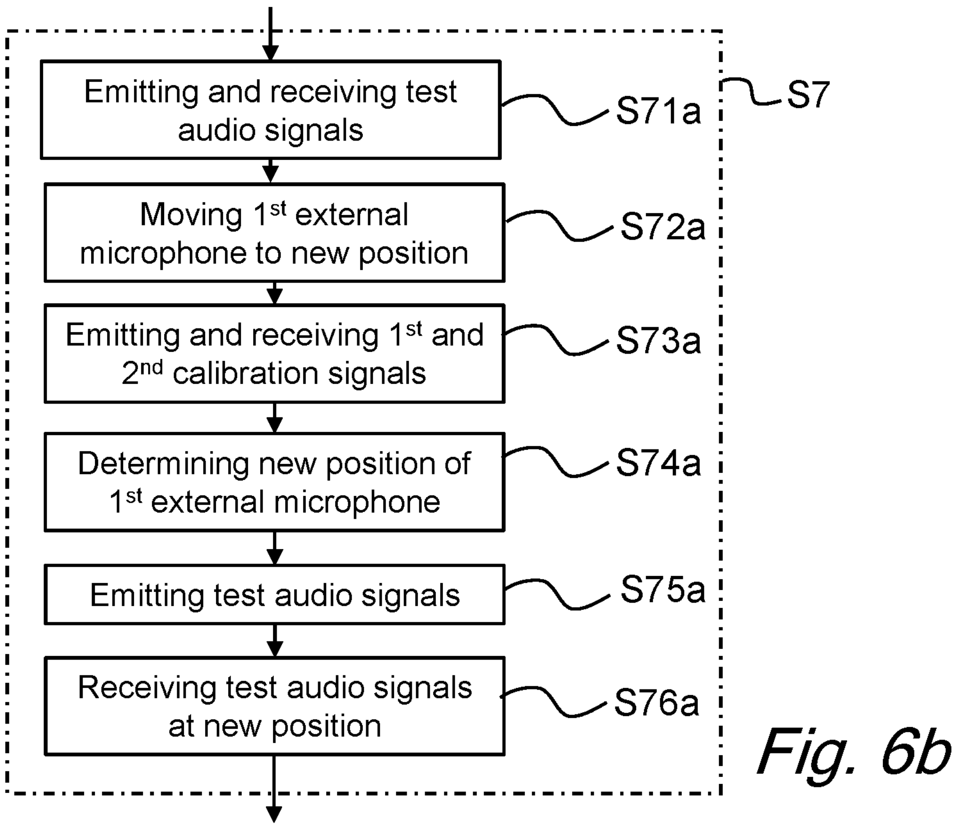

With reference to FIG. 5*a*, FIG. 5*b* and FIG. 6*a*, a method for calibrating an loudspeaker system comprising at least an audio device 10 will now be described in detail.

At step S1 in FIG. 6*a*, the first external microphone 20 is placed at the listening position in the acoustic environment 1. With the first external microphone 20 placed in the acoustic environment 1 the audio device 10 then emits a first and second calibration audio signal at S2*a* and S2*b* using the first and second loudspeaker 11, 12 respectively. The calibration audio signals may be any type of audio signals as long as the audio signals are distinguishable from each other. The audio signals could be distinguishable in time, e.g., by being emitted sequentially, and/or in frequency, by comprising non overlapping frequency content. Accordingly, the calibration audio signals could be identical but emitted sequentially or different (e.g., in terms of frequency content) and emitted simultaneously. In one embodiment, the calibration audio signals are emitted sequentially and comprise a frequency sweep. With a frequency sweep it is meant a signal (e.g., a sine wave), the frequency of which is increased or decreased from a starting frequency to a stop frequency. For example, the frequency sweep is from 0.1 Hz to 24 kHz or vice versa and takes 3 seconds.

At step S3*a* and S3*b* the first external microphone 20 receives the emitted first and second calibration audio signals and at step S4 the position of the first external microphone 20 relative to the audio device 10 is determined.

The position of the first external microphone 20 relative to the audio device 10 is determined at step S4 by comparing e.g., the point in time when the first calibration audio signal is emitted from the first loudspeaker 11 and the point in time when the first calibration audio signal is received by the first external microphone 20. By comparing these points in time the acoustic travel time between the first loudspeaker 11 and first external microphone 20 can be determined. The acoustic travel time can then be used to determine the physical distance $d_{11}$ between first loudspeaker 11 and the first external microphone 20. Analogously, the physical distance $d_{12}$ between second loudspeaker 12 and the first external microphone 20 can also be determined based on the transmission and reception of the second calibration audio signal.

Seen in a horizontal plane, the distances $d_{11}$ and $d_{12}$ shown in FIG. 5*a* define two sides of a triangle, with the third side being determined by the horizontal separation of the first and second loudspeakers 11, 12 which is known due to the fixed design of the audio device 10. Using the distances $d_{11}$, $d_{12}$ and the horizontal separation distance between the first and second loudspeakers 11, 12, the distance between any point (e.g., a center point $p_0$) of the audio device 10 and the first external microphone 20 can be determined. This distance $d_{center}$ is called the radial distance from the audio device 10 to the first external microphone 20.

Additionally or alternatively, the azimuth angle (e.g., represented with an angle θ in the horizontal plane) can be determined by the distances $d_{11}$, $d_{12}$ and the horizontal separation distance between the first and second loudspeakers 11, 12.

In other words, the position of the first external microphone 20 (and thereby also the listening position) can be completely determined in a two-dimensional plane by extracting the radial distance $d_{center}$ and the azimuth angle θ from the received first and second calibration audio signals.

However, the calibration audio signal measurements on their own will not reveal the elevation angle φ of this two-dimensional plane shown in FIG. 5*b*. To this end, it is assumed that the first external microphone 20 is arranged at a predetermined listening position height of $H_{sit}+H_{mic}$ relative to a ground plane 50 of the environment. Indeed, as the first external microphone 20 may be provided on a stand 21 configured to be placed on a chair or couch 51 this assumption will be very accurate in most cases. Accordingly, the elevation angle φ can therefore be determined accurately, without user input as the height of the listening position/first external microphone 20 is approximated by a default average value of $H_{sit}+H_{mic}$ and the position of the audio device 10 is approximated by a default value of $H_{device}$ (e.g., just below the average television height above the floor). Alternatively, the audio device 10 is provided on a floor stand of a predetermined height, meaning that the height $H_{device}$ is known from the predetermined height of the floor stand. It is understood that the difference between $H_{sit}+H_{mic}$ and $H_{device}$ together with the radial distance $d_{center}$ will yield the elevation angle φ.

In some implementations, user input is obtained at step S4' in FIG. 6*a* and used to further enhance the accuracy of the elevation angle φ. The user input could be a direct measurement of at least one of $H_{sit}+H_{mic}$, $H_{sit}$, $H_{mic}$, $H_{device}$ and the difference between $H_{sit}+H_{mic}$ and $H_{device}$ with any remaining heights being replaced with a default value or a selected category default value. Alternatively or additionally, the user selects one or more categories describing the acoustic environment 1 wherein each category is associated with a default value for at least one of the heights $H_{sit}+H_{mic}$, $H_{sit}$, $H_{mic}$, $H_{device}$ and the difference between $H_{sit}+H_{mic}$ and $H_{device}$. For example, the user could specify whether the audio device 10 is placed above or below the television 40, whether the audio device 10 is mounted onto the wall or placed onto a piece of furniture, whether the listening position involves the user 25 sitting in a chair or in a couch 51, and/or whether the first external microphone 20 is positioned on its stand 21 or placed on the sitting surface and/or headrest of the chair or couch 51.

In some implementations, the position of the listening position (i.e. the position of the first external microphone 20) is used to calibrate the loudspeakers of the audio device 10. The calibration of the loudspeakers of the audio device 10 may comprise adjusting at least one of: a loudspeaker gain, a loudspeaker delay, a loudspeaker phase, a loudspeaker equalization and a loudspeaker role (e.g., front left, center or front right) of the loudspeakers in the audio device 10.

In some implementations, the loudspeaker system comprises at least one external loudspeaker in addition to the audio device 10. In some such implementations, the method further comprises step S7 of determining the position of the external loudspeakers using the first external microphone 20 positioned at the listening position.

The position of the external loudspeakers is determined by controlling (e.g., with the central control unit 18) each external loudspeaker to individually emit distinguishable test audio signals at step S5. The test audio signals could be the same as the calibration audio signals played by the audio device 10 and e.g., involve a frequency sweep which is sequentially played by each external loudspeaker. The test audio signals are received at step S6 by the first external microphone 20 and the first and second internal microphone 13, 14 of the audio device 10. The position of each external loudspeaker can then be determined by trilateration by comparing the absolute time of arrival of the test audio signals at each of the microphones 13, 14, 20 and considering the determined position of the first external microphone 20 relative to the audio device 10 (and therefore also the first and second internal microphones 13, 14). It is envisaged that while step S4 is performed prior to step S5 and S6 in FIG. 6*a* this order is merely exemplary, and in some implementations step S5 and S6 are performed prior to step S4.

Using three microphones 13, 14, 20 to triangulate the position of an external loudspeaker leads to an ambiguity in the position of the external loudspeaker wherein two solutions for the position are obtained, wherein the two possible positions of the external loudspeaker are mirrored in a plane spanned by the first and second internal microphone 13, 14 and the first external microphone 20 at the listening position. This ambiguity may be resolved with a default setting wherein e.g., always the solution being above the plane defined by the first and second internal microphone 13, 14 and the first external microphone 20 is selected for external loudspeakers behind the listening position and vice versa for external loudspeakers in front of the listening position.

In some implementations, the ambiguity is resolved by the central control unit 18 obtaining loudspeaker information at step S7' shown in FIG. 6*a*. The loudspeaker information may be transmitted from each external loudspeaker to the central control unit 18 (e.g., wirelessly or over a wire) or the loudspeaker information is provided by a user. The loudspeaker information comprises at least one of: loudspeaker model, loudspeaker type, internal processing delay of the loudspeaker, and how the loudspeaker is configured to be mounted (e.g., wall-mounted, ceiling-mounted or placed on a pedestal). For instance, if an external loudspeaker is ceiling or wall mounted it may be assumed that the external loudspeaker is above the plane spanned by the three microphones 13, 14, 20. In many cases, the internal processing delay of the external loudspeaker(s) is the most important parameter to determine. The internal processing delay could e.g., be derived from other types of loudspeaker information (e.g., the loudspeaker model) wherein the internal processing delay is determined (e.g., from a look-up table of loudspeaker models and associated internal processing delays) based on the available loudspeaker information. As a further example, the internal processing delay of an external loudspeaker may be determined by placing the first external microphone right next to the external loudspeaker and playing a test audio signal with the external loudspeaker. As the acoustic travel distance is in this scenario is negligible it is easy to determine the internal processing delay as the time between rendering the test audio signal to the external loudspeaker and the time when the test audio signal is received by the first external microphone.

The determined position of the external loudspeakers is then used at step S8 to calibrate at least one external loudspeaker of the loudspeaker system. Wherein the calibration of the at least one external loudspeaker involves adjusting/assigning at least one of: an external loudspeaker gain, an external loudspeaker delay, an external loudspeaker phase, an external loudspeaker equalization and an external loudspeaker role (e.g., rear-left, left-side, right-height) based on the determined position of the external loudspeaker relative to the listening position. For instance, external loudspeakers which are further away from the listening position may be provided with a shorter delay and higher gain compared to external loudspeakers which are closer to the listening position so as to achieve a balanced sound image at the listening position.

Figure 6C:
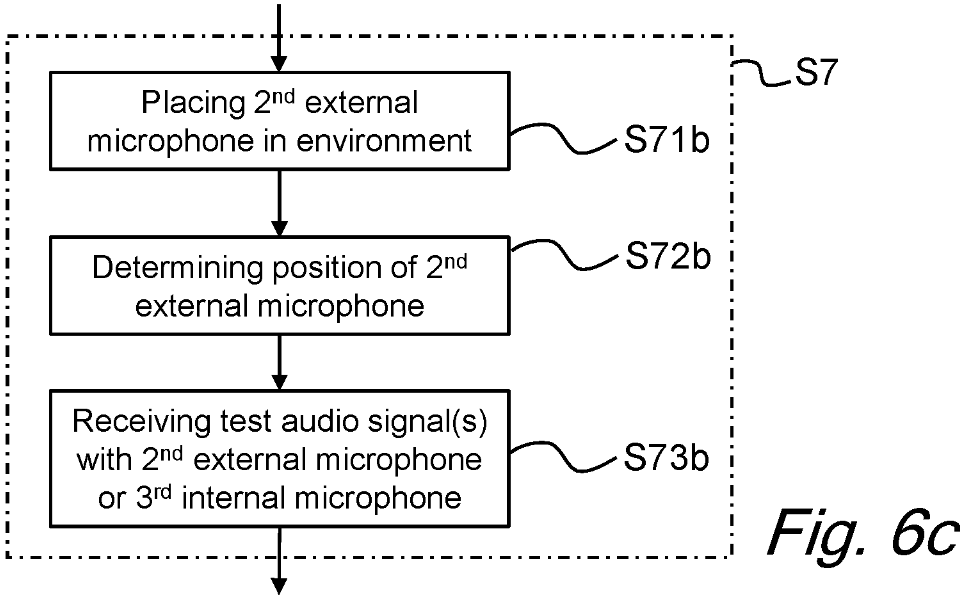
Figure 7A:
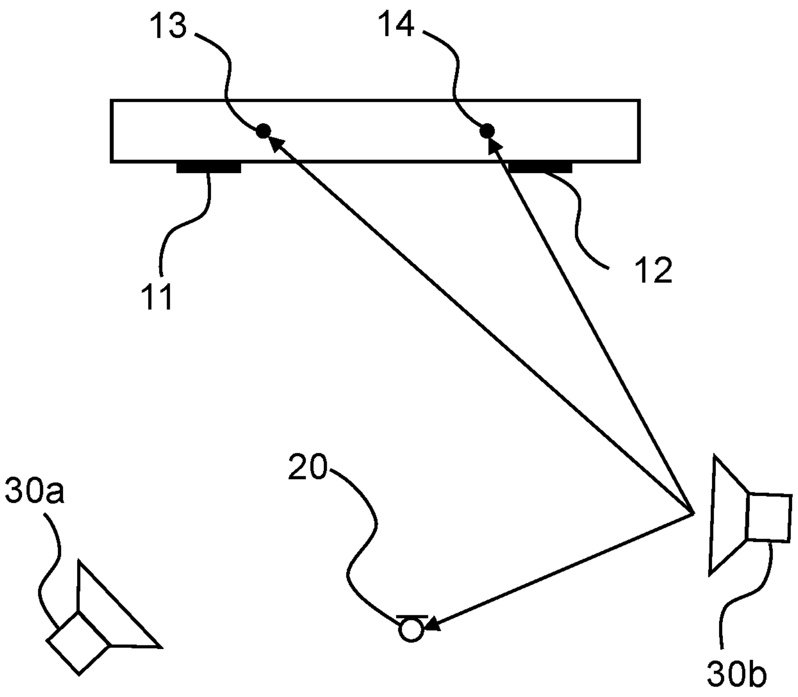
Figure 7B:
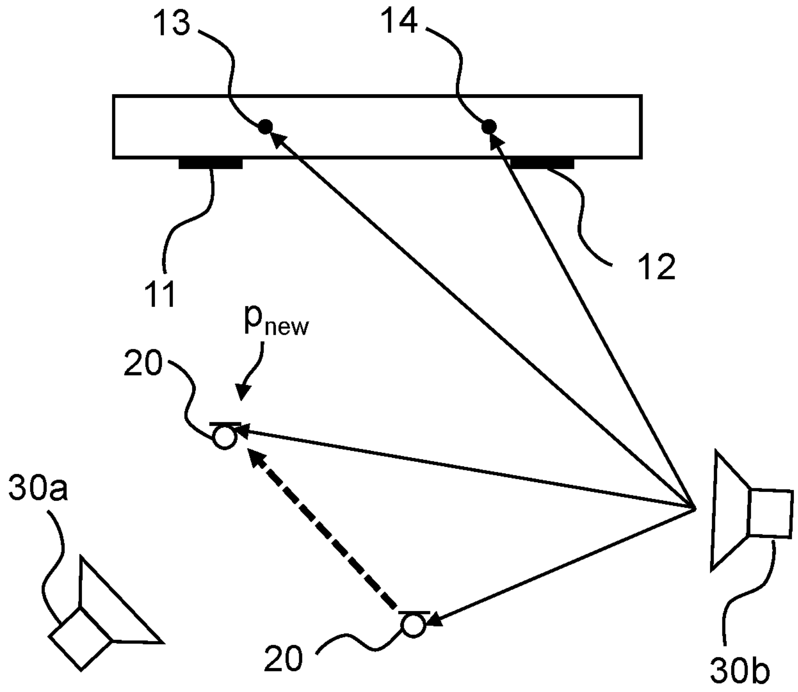

With reference to FIG. 6*b*, 6*c* and FIG. 7*a*, 7*b*, 7*c* the process of determining the position of at least one external loudspeaker 30*a*, 30*b* will now be described in further detail. As seen in FIG. 7*a* the test audio signal emitted from the external loudspeaker 30*b* reaches the first external microphone 20 and the first and second internal microphone 13, 14 of the audio device 10. Using the received test audio signal at the three microphones 13, 14, 20 the position (e.g., expressed in X, Y and Z coordinates) of the external loudspeaker 30*b* can be determined. As indicated in the above the ambiguity brought by mirrored solutions in the plane spanned by the three microphones 13, 14, 20 can be resolved by a default setting and/or loudspeaker information.

Alternatively or additionally, the position of the external loudspeaker 30*b* can be determined by moving the first external microphone 20 to a new position and repeating some of the steps of the method. This will now be described in further detail with reference to FIG. 6*b* and FIG. 7*b*. As seen, step S7 of determining the position of the external loudspeaker(s) 30*a*, 30*b* may comprise step S71*a* of emitting a distinguishable test audio signal from each external loudspeaker 30*a*, 30*b* and receiving the test audio signals with the first and second internal microphone 13, 14 of the audio device 10 and the first external microphone 20 at the listening position. Then, at step S72*a* the first external microphone 20 is moved to a new position, $p_{new}$, different from the listening position. Preferably, the new position $p_{new}$ is at a height relative to the floor which differs from the listening position. To determine the position $p_{new}$ relative to the audio device 10, first and second calibration audio signals are again emitted from the loudspeakers of the audio device 10 at step S73*a* and received by the first external microphone 20 at the new position $p_{new}$. The position $p_{new}$ is then determined at S74*a* in an analogous manner to how the listening position is determined.

Preferably, the user is instructed to place the first external microphone 20 on the floor for the new position $p_{new}$ which enables the height above the floor of the new position to be estimated accurately (e.g., by the height of the microphone stand 21). At step S75*a* test signals are again emitted from the external loudspeakers 30*a*, 30*b* to be received at S76*a* by the first external microphone 20 at the new position $p_{new}$. It is noted that as the audio device 10 is expected to be stationary, it is not necessary for the first and second internal microphones 13, 14 to receive the test audio signals when they are emitted the second time.

Based on the position of the first external microphone 20 at the listening position, the new position $p_{new}$, and the test audio signals received by the first and second internal microphone 13, 14, the first external microphone 20 at the listening position and the first external microphone 20 at the new position $p_{new}$ the position of each external loudspeaker

30*a*, 30*b* is determined using trilateration. Thanks to the test audio signals received by the first external microphone 20 at the new position $p_{new}$ there remains no ambiguity as to the position of any external loudspeaker.

Figure 7C:
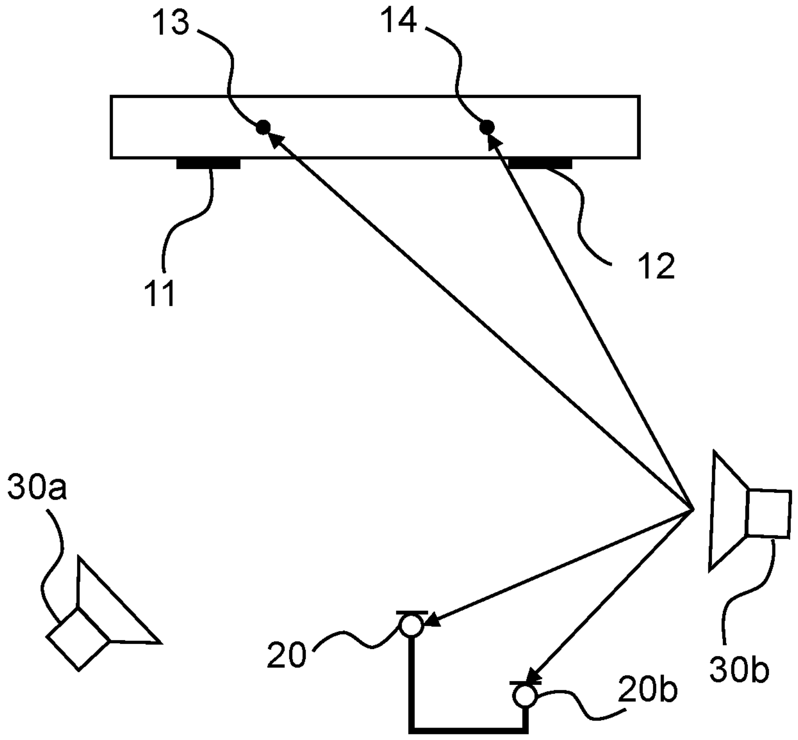

Alternatively or additionally, the position of the external loudspeaker 30*b* can be determined using a second external microphone 20*b* or a third internal microphone 15 (as shown in FIG. 1) as will be described with reference to FIG. 6*c* and FIG. 7*c*. As seen, step S7 of determining the position of the external loudspeaker 30*a*, 30*b* may comprise step S71*b* of placing a second external microphone 20*b* in the acoustic environment 1. The second external microphone 20*b* may be identical to the first external microphone 20 (or e.g., realized with a user device). The second external microphone 20*b* may be placed on a same stand as the first external microphone 20, for instance the second external microphone 20*b* may be arranged vertically above or below the first external microphone 20 with a predetermined vertical separation distance. Accordingly, the position of the second external microphone 20*b* relative to the audio device 10 may be linked to the position of the first external microphone 20. Accordingly, there is no need to determine the position of the second external microphone 20*b* by emitting and receiving calibration audio signals with the second external microphone 20*b*.

However, it is also envisaged that the second external microphone 20*b* is separate from the first external microphone 20. In such cases, the second external microphone 20*b* also receives the calibration audio signals emitted by the audio device 10 at steps S2*a* and S2*b* from FIG. 6*a*. Based on the received calibration audio signals the position of the second external microphone 20*b* relative to the audio device 10 is determined at step S72*b*.

At step S73*b* the test audio signal emitted by the external loudspeaker 30*b* is received by the second external microphone 20*b* (in addition to the test audio signal being received by the first and second internal microphone 13, 14 and the first external microphone 20). Using the test audio signals received by these four microphones 13, 14, 20, 20*b* and the determined position of the first external microphone 20 and the second external microphone 20*b*, the position of the external loudspeaker 30*b* may be determined (without ambiguity) using trilateration.

Alternatively, step S73*b* comprises receiving the test audio signal emitted by the external loudspeaker 30*b* with the third internal microphone 15 (in addition to the test audio signal being received by the first and second internal microphone 13, 14 and the first external microphone 20) and determining the position of the external loudspeaker 30*b* (without ambiguity) using the test audio signal received with these four microphones 13, 14, 15, 20. If the audio device 10 comprises a third internal microphone it is not necessary to provide a second external microphone 20*b* and therefore in some implementations, steps S71*b* and S72*b* are omitted.

The above described methods for determining the position of the external loudspeaker 30*b* may then be repeated for each external loudspeaker 30*a*, 30*b* present in the acoustic environment 1 so as to determine the position of all external loudspeakers 30*a*, 30*b* relative to the listening position and the audio device 10.

FIG. 8 illustrates the estimated position of a plurality of external loudspeakers, Lf (Left front), Ls (Left side), Lb (Left back), Lfh (Left front height), Lsh (Left surround height), Rf (Right front), Rs (Right side), Rb (Right back), Rfh (Right front height), Rsh (Right surround height) using the method as described in the above. The estimated position of each external loudspeaker is represented with X, Y and Z coordinates and plotted in a coordinate system together with the actual (using physical measurements) positions of the external loudspeakers. The estimated position of the first and second internal microphone 13, 14 of the audio device 10 and the first external microphone 20 are also plotted in the coordinate system. As seen, the estimated position of each external loudspeaker is very close to the actual position of each external loudspeaker. Experiments have shown that an average accuracy of 0.16 meters is obtainable with 50% of the estimated positions of the external loudspeakers seeing an even better accuracy of 0.09 meters and 95% of the estimated positions having an accuracy of 0.33 meter or better. It is understood that when calibrating the loudspeaker system in aspects other than loudspeaker role assignation (e.g., delay, phase, equalization or gain) a higher accuracy is obtainable as the first external microphone 20 is placed at the intended listening position. The TOA or TDOA of the calibration and test audio signals received by the first external microphone 20 can 95% of the time be determined at an accuracy of 0.1 milliseconds or better, which translates to a spatial accuracy (i.e. absolute acoustic travel distance) of 0.03 meters or better.

Accordingly, the method allows a user to place external loudspeakers almost arbitrarily in the acoustic environment wherein the calibration will assign a suitable role to each (e.g., Lf, Rf or Rsh) automatically, without the user having to specify which loudspeaker that is intended for which role (e.g., by connecting it to a certain loudspeaker output port of the central control unit 18).

The person skilled in the art realizes that the present invention by no means is limited to the preferred embodiments described above. On the contrary, many modifications and variations are possible within the scope of the appended claims. For example, it is possible to use both a second external microphone and loudspeaker information to further enhance the accuracy of determining the position of external loudspeakers.

What is claimed is:

1. A method for calibrating a loudspeaker system in an environment, the loudspeaker system comprising a soundbar comprising a first and second loudspeaker arranged with a predetermined horizontal separation, the method comprising:

a) emitting a first calibration audio signal from the first loudspeaker of the soundbar;

b) emitting a second calibration audio signal from the second loudspeaker of the soundbar, wherein the second calibration audio signal is distinguishable from the first calibration audio signal;

c) receiving, with a first external microphone placed at a listening position in the environment, the first and second calibration audio signal, wherein the first external microphone is at least one of: mounted on a microphone stand and integrated with the microphone stand, wherein the microphone stand is configured to position the first external microphone at the listening position with a predetermined listening position height relative to a ground plane of the environment, wherein the listening position is where a listener is expected position his/her head;

d) determining, based on the received first and second calibration audio signal, the position of the first external microphone relative to the soundbar, wherein determining the position comprises:

determining at least one of an azimuth angle, θ, of the first external microphone relative to the soundbar and a radial distance, $d_{center}$ between the first external microphone and the soundbar; and determining, based on the received first and second calibration audio signal and the predetermined listening position height associated with the microphone stand an elevation angle, φ of the first external microphone relative to the soundbar; and e) calibrating the loudspeaker system based on the determined position of the first external microphone.

2. The method according to claim 1, wherein determining the position of the first external microphone relative to the soundbar comprises:

determining a time of arrival of the received first and second calibration audio signal; and determining the position of the first external microphone based on the time of arrival of the received first and second calibration audio signals and the speed of sound.

3. The method according to claim 2, further comprising:

obtaining a delay metric of the first and second loudspeaker respectively, the delay metric indicating a duration between a first point in time, when the first or second calibration audio signal is provided to the first or second loudspeaker, and a second point in time, when the first or second calibration audio signal is reproduced by the first or second loudspeaker; and wherein determining the position of the first external microphone is further based on the delay metric of the first and second loudspeaker.

4. The method according to claim 1, wherein said loudspeaker system further comprises at least one external loudspeaker being separate from the soundbar, and wherein the soundbar further comprises a first and second internal microphone arranged on the soundbar at known respective distances to the first and second loudspeaker, the method further comprising:

f) emitting a test audio signal from the at least one external loudspeaker;

g) receiving the test audio signal with the first external microphone;

h) receiving the test audio signal with the first and second internal microphones; and i) determining the position of the at least one external loudspeaker based on the position of the first external microphone and the received test audio signal of the first external microphone and the first and second internal microphone;

wherein calibrating the loudspeaker system is further based on the determined position of the at least one external loudspeaker.

5. The method according to claim 4, further comprising:

obtaining a loudspeaker property of the at least one external loudspeaker; and wherein determining the position of the at least one external loudspeaker is further based on the loudspeaker property of the at least one external loudspeaker.

6. The method according to claim 4, further comprising:

receiving the test audio signal of the at least one external loudspeaker with a second external microphone provided in the environment or with a third internal microphone of the soundbar; and wherein determining the position of the at least one external loudspeaker is further based on the received test audio signal of the second external microphone or third internal microphone and the position of the second external microphone or third internal microphone relative to the soundbar.

7. The method according to claim 4, further comprising:

repeating steps a) to d) after the first external microphone has been moved to a new position, $p_{new}$, said new position, $p_{new}$, being different from the listening position; and repeating steps f) and g);

wherein determining the position of the at least one external loudspeaker is further based on the position of the first external microphone at the new position, $p_{new}$, and the received test signal of the first external microphone at the new position.

8. The method according to claim 1, wherein calibrating the loudspeaker system comprises assigning a speaker role to at least one loudspeaker of the loudspeaker system and/or adjusting at least one of a delay, phase, equalization or gain for at least one loudspeaker of the loudspeaker system.

9. The method according to claim 1, wherein the soundbar comprises at least one of a sidewards-firing loudspeaker and an upwards-firing loudspeaker, and wherein the soundbar comprises at least two loudspeakers configured to perform loudspeaker virtualization comprising establishing two acoustic channels forming a binaural acoustic channel pair impinging on a predetermined spatial region, said method further comprises:

determining if the position of the first external microphone is within the predetermined spatial region;

if the position is within the predetermined spatial region, calibrating the loudspeaker system comprises disabling the at least one sidewards-firing loudspeaker or upwards-firing loudspeaker; and if the position is outside the predetermined spatial region, calibrating the loudspeaker system comprises disabling the loudspeaker virtualization.

10. A computer program product comprising instructions which, when the program is executed by a central control unit of the soundbar, causes the central control unit to carry out the method according to claim 1.

11. A kit comprising a soundbar with two loudspeakers and an external calibration microphone provided on a stand, wherein the soundbar comprises a controller configured to perform the method according to claim 1.

12. The kit according to claim 11, wherein the kit is provided in a single package.

13. A system for calibrating a loudspeaker system in an environment comprising:

a soundbar comprising a first loudspeaker and a second loudspeaker arranged with a predetermined horizontal separation, a first external microphone, configured to be placed at a listening position in the environment, wherein the first external microphone is at least one of: mounted on a microphone stand or integrated with the microphone stand, wherein the microphone stand is configured to position the first external microphone at the listening position with a predetermined listening position height relative to a ground plane of the environment, wherein the listening position is where a listener is expected position his/her head, and a central control unit, configured to:

cause a first calibration audio signal to be emitted from the first loudspeaker, cause a second calibration audio signal to be emitted from the second loudspeaker, wherein the second calibration audio signal is distinguishable from the first calibration audio signal, cause the first external microphone to receive the first and second calibration audio signal, determine, based on the received first and second calibration audio signal, the position of the first external microphone relative to the soundbar, by determining at least one of an azimuth angle, θ, of the first external microphone relative to the soundbar and a radial distance, $d_{center}$, between the first external microphone and the soundbar, and determining, based on the received first and second calibration audio signal and the predetermined listening position height associated with the microphone stand an elevation angle, φ, of the first external microphone relative to the soundbar, and calibrate the loudspeaker system based on the determined position of the first external microphone.

14. The system according to claim 13, wherein the microphone stand has a length of between 70 centimeters and 80 centimeters.

15. The system according to claim 13, wherein the soundbar is a soundbar configured to be placed below or above a television.

16. A method for calibrating a loudspeaker system in an environment, the loudspeaker system comprising an audio device with a first and second loudspeaker arranged with a predetermined horizontal separation, the method comprising:

a) emitting a first calibration audio signal from the first loudspeaker of the audio device;

b) emitting a second calibration audio signal from the second loudspeaker of the audio device, wherein the second calibration audio signal is distinguishable from the first calibration audio signal;

c) receiving, with a first external microphone placed at a listening position in the environment, the first and second calibration audio signal, wherein the first external microphone is arranged on a microphone stand configured to position the first external microphone at a predetermined listening position height relative to a ground plane of the environment;

d) determining, based on the received first and second calibration audio signal, the position of the first external microphone relative to the audio device, wherein determining the position comprises:

determining at least one of an azimuth angle, θ, of the first external microphone relative to the audio device and a radial distance, $d_{center}$ between the first external microphone and the audio device, and determining, based on the received first and second calibration audio signal and the predetermined listening position height associated with the microphone stand an elevation angle, φ of the first external microphone relative to the audio device; and e) calibrating the loudspeaker system based on the determined position of the first external microphone;

wherein said loudspeaker system further comprises at least one external loudspeaker being separate from the audio device;

wherein the audio device further comprises a first and second internal microphone arranged on the audio device at known respective distances to the first and second loudspeaker; and wherein the method further comprises:

f) emitting a test audio signal from the at least one external loudspeaker;

g) receiving the test audio signal with the first external microphone;

h) receiving the test audio signal with the first and second internal microphones; and i) determining the position of the at least one external loudspeaker based on the position of the first external microphone and the received test audio signal of the first external microphone and the first and second internal microphone;

wherein calibrating the loudspeaker system is further based on the determined position of the at least one external loudspeaker.

17. The method according to claim 16, wherein:

the method further comprises obtaining a loudspeaker property of the at least one external loudspeaker; and determining the position of the at least one external loudspeaker is further based on the loudspeaker property of the at least one external loudspeaker.

18. The method according to claim 16, wherein:

the method further comprises receiving the test audio signal of the at least one external loudspeaker with a second external microphone provided in the environment or with a third internal microphone of the audio device; and determining the position of the at least one external loudspeaker is further based on the received test audio signal of the second external microphone or third internal microphone and the position of the second external microphone or third internal microphone relative to the audio device.

19. The method according to claim 16, wherein:

the method further comprises:

repeating steps a) to d) after the first external microphone has been moved to a new position, $p_{new}$, said new position, $p_{new}$, being different from the listening position; and repeating steps f) and g); and determining the position of the at least one external loudspeaker is further based on the position of the first external microphone at the new position, $p_{new}$, and the received test signal of the first external microphone at the new position.

* * * * *